(12) United States Patent
Nojiri et al.

(10) Patent No.: US 6,688,442 B2
(45) Date of Patent: Feb. 10, 2004

(54) POWER TRANSMISSION DEVICE

(75) Inventors: Hiromi Nojiri, Shizuoka (JP);
Takahide Saito, Shizuoka (JP);
Takashi Nozaki, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/142,973

(22) Filed: May 13, 2002

(65) Prior Publication Data

US 2002/0166744 A1 Nov. 14, 2002

(30) Foreign Application Priority Data

May 14, 2001 (JP) ........................ 2001-143500

(51) Int. Cl.[7] .......................... F16D 47/04; F16D 67/04
(52) U.S. Cl. .................... 192/13 R; 192/12 B; 192/38; 192/48.4; 192/48.92; 192/55.61; 192/87.11
(58) Field of Search .............................. 192/13 R, 12 B, 192/48.4, 48.7, 48.92, 38, 55.61, 58.42, 87.11, 85 AA, 103 F, 219.2, 219.3; 74/411.5

(56) References Cited

U.S. PATENT DOCUMENTS

| | | | | |
|---|---|---|---|---|
| 1,496,740 A | * | 6/1924 | Rauen | 192/219.2 |
| 2,072,057 A | * | 2/1937 | Rauen | 192/219.3 |
| 2,072,059 A | * | 2/1937 | Rauen | 192/219.3 |
| 5,156,249 A | * | 10/1992 | Friedmann | 192/55.61 |
| 6,481,548 B2 | * | 11/2002 | Monahan et al. | 192/38 |

FOREIGN PATENT DOCUMENTS

| | | | |
|---|---|---|---|
| JP | 2000-310260 | | 11/2000 |
| JP | 2001-82512 A | * | 3/2001 |

* cited by examiner

Primary Examiner—Rodney H. Bonck
(74) Attorney, Agent, or Firm—Wenderoth, Lind & Ponack, L.L.P.

(57) ABSTRACT

A power transmission device is proposed which makes it easy to start on a slope. A control type slip clutch and a mechanical type control type two-way clutch are mounted between an input shaft to which the rotation of an engine is transmitted and an output shaft mounted around the input shaft. The input shaft and the output shaft are engaged together by the slip clutch while producing slip, and thereafter the two-way clutch is engaged. This improves transmission efficiency. A one-way clutch is provided between the output shaft and a housing provided around the output shaft. In a stopped state on an upward slope, when depressing of the brake pedal is released and rotation in the reverse direction to the revolving direction of the engine is transmitted to the output shaft from the vehicle wheel side, the output shaft is locked by the operation of the one-way clutch, thereby preventing the vehicle from moving in the opposite direction to the moving direction.

19 Claims, 7 Drawing Sheets

POWER TRANSMISSION DEVICE

BACKGROUND OF THE INVENTION

This invention relates to a power transmission device for transmitting the turning torque of an engine to vehicle wheels through a transmission.

In a power transmission device for transmitting the turning force of an engine to a transmission through a torque converter, since the torque converter has a creeping function, smooth start is possible. Also, start on an upward slope is easy. But there is a problem that since slip is produced between the input and the output, transmission efficiency and thus fuel economy are bad.

In order to solve this problem, JP patent publication 2000-310260 proposes a power transmission device in which a slip control type clutch comprising a wet type multiple disc clutch and a wedge force control type clutch comprising a roller clutch are provided between an input shaft, to which the turning torque of the engine is transmitted, and an output shaft. At the start, the wet type multiple disc clutch is engaged to transmit the rotation of the input shaft to the output shaft while producing slip. When the turning torque of the output shaft reaches a preset value or the difference in the number of revolutions between the input shaft and the output shaft drops below a predetermined value, the wedge force control type clutch is engaged, and thereafter the slip control type clutch is disengaged.

In the prior art power transmission device, since at the start, the slip control type clutch is engaged to transmit the turning torque between the input shaft and the output shaft while producing slip, smooth start is possible. Also, since the wedge force control type clutch is engaged after the slip control type clutch is engaged, the engaging time of the slip control type clutch may be short. Thus it is possible to reduce energy loss and improve fuel economy.

In the prior art power transmission device, when the brake pedal is released for restart in a stopped state on an upward slope, a turning torque in an opposite direction to the revolving direction of the engine is transmitted from the wheel side to the output shaft, so that the vehicle body moves in a direction opposite to the advancing direction. This makes it difficult to start on a slope.

Also, when the wedge force type clutch is engaged, rollers mounted in wedge-shaped spaces impulsively bite into narrow portions of the wedge-shaped spaces, so that engaging shock is produced.

An object of this invention is to provide a power transmission device in which a control type slip clutch and a mechanical type control type two-way clutch using engaging elements such as rollers are mounted between an input shaft and an output shaft and which makes easy start on a slope and absorbs engagement shock of the control type two-way clutch.

SUMMARY OF THE INVENTION

According to this invention, there is provided a power transmission device comprising an input shaft to which the turning torque of an engine is transmitted, an annular output shaft mounted coaxially with the input shaft for transmitting the turning torque transmitted from the input shaft to vehicle wheel side, a control type slip clutch mounted between the input shaft and the output shaft for engaging the input shaft and the output shaft together while producing slip, a mechanical type control type two-way clutch using engaging elements for engaging the input shaft and the output shaft together after the control type slip clutch has been engaged, and a one-way clutch provided between the output shaft and a stationary member provided radially outside of the output shaft for engaging the output shaft with the stationary member to lock the output shaft when a turning torque in an opposite direction to the rotating direction of the engine is transmitted to the output shaft from the vehicle wheel side.

By providing a one-way clutch between the output shaft and the stationary member provided outside thereof, when depressing of the brake pedal is released in a stopped state on an upward slope, rotation in the opposite direction to the revolving direction of the engine is transmitted to the output shaft from the vehicle wheel side, so that the one-way clutch is engaged, thereby locking the output shaft. Since the output shaft is locked, the vehicle body is prevented from moving in the reverse direction to the moving direction. This makes start on a slope easy.

As the one-way clutch, a one-way roller clutch may be used which locks the output shaft by engaging rollers into narrow portions of wedge-shaped spaces.

In the power transmission device according to said invention, by providing a rotation shock absorbing damper for damping shocks in a rotational direction in a power transmission line for transmitting turning torque from the engine to the input shaft, it is possible to absorb shocks when the rotation of the engine is transmitted to the input shaft. Thus, it is possible to smoothly transmit rotation of the engine to the input shaft.

As the control type slip switch, a wet type multiple disc clutch may be used. On the other hand, as the control type two-way clutch, a control type two-way roller clutch may be used which controls the rotation of a retainer mounted between the input shaft and the output shaft, thereby engaging rollers retained by the retainer into narrow portions of wedge-shaped spaces to transmit the rotation of the input shaft to the output shaft.

By providing the control type two-way clutch with a clutch outer ring and fitting the clutch outer ring on the inner periphery of the output shaft with a small clearance, the clutch outer ring is elastically deformed diametrically outwardly and pressed against the inner peripheral surface of the output shaft when engaging elements engage the outer periphery of the input shaft and the inner periphery of the clutch outer ring. Thus, it is possible to absorb shocks upon engagement by action of the elastic deformation of the clutch outer ring and the slip until the clutch outer ring and the output shaft engage together.

Other features and objects of the present invention will become apparent from the following description made with reference to the accompanying drawings, in which:

DETAILED DESCRIPTION OF THE PREFERRED EMBODIMENTS

Figure 1:
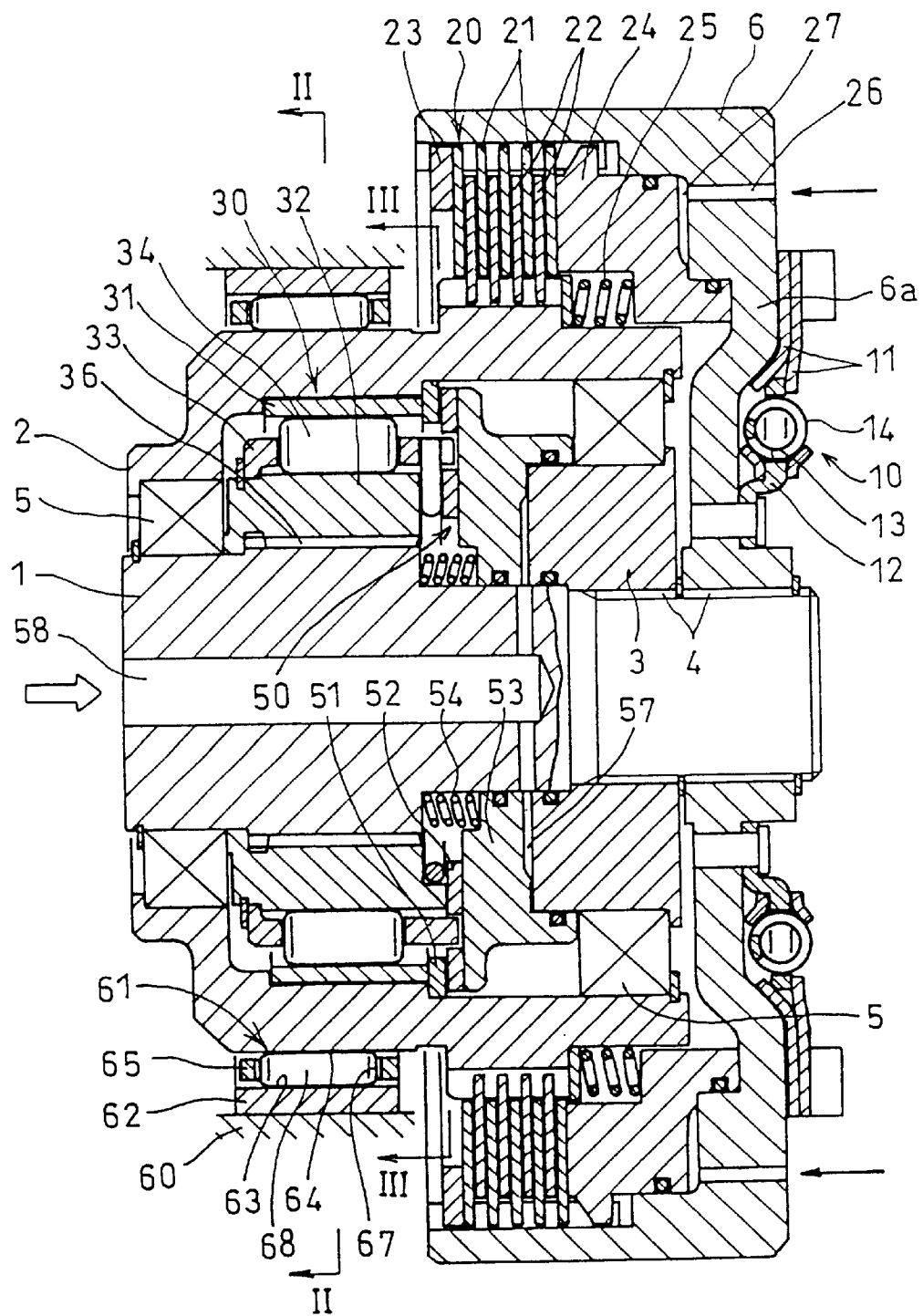
FIG. 1 is a longitudinal sectional front view showing a first embodiment of the power transmission device according to this invention.

Hereinbelow, the embodiments of this invention will be described based on the drawings. As shown in FIG. 1, around an input shaft 1, an annular output shaft 2 is coaxially mounted. A bearing support ring 3 is mounted on the rear end of the input shaft 1. The bearing support ring 3 is coupled to the input shaft 1 by serrations 4. Bearings 5 which support the input shaft 1 and the output shaft 2 so as to be rotatable relative to each other are mounted between the bearing support ring 3 and the rear end of the output shaft 2 and between the front ends of the input shaft 1 and the output shaft 2, respectively.

At the rear end of the input shaft 1, an input outer ring 6 is provided and fitted on the rear end of the output shaft 2. The input outer ring 6 has an end plate 6a, which is fitted on the input shaft 1 and coupled thereto by the serrations 4.

Figure 4:
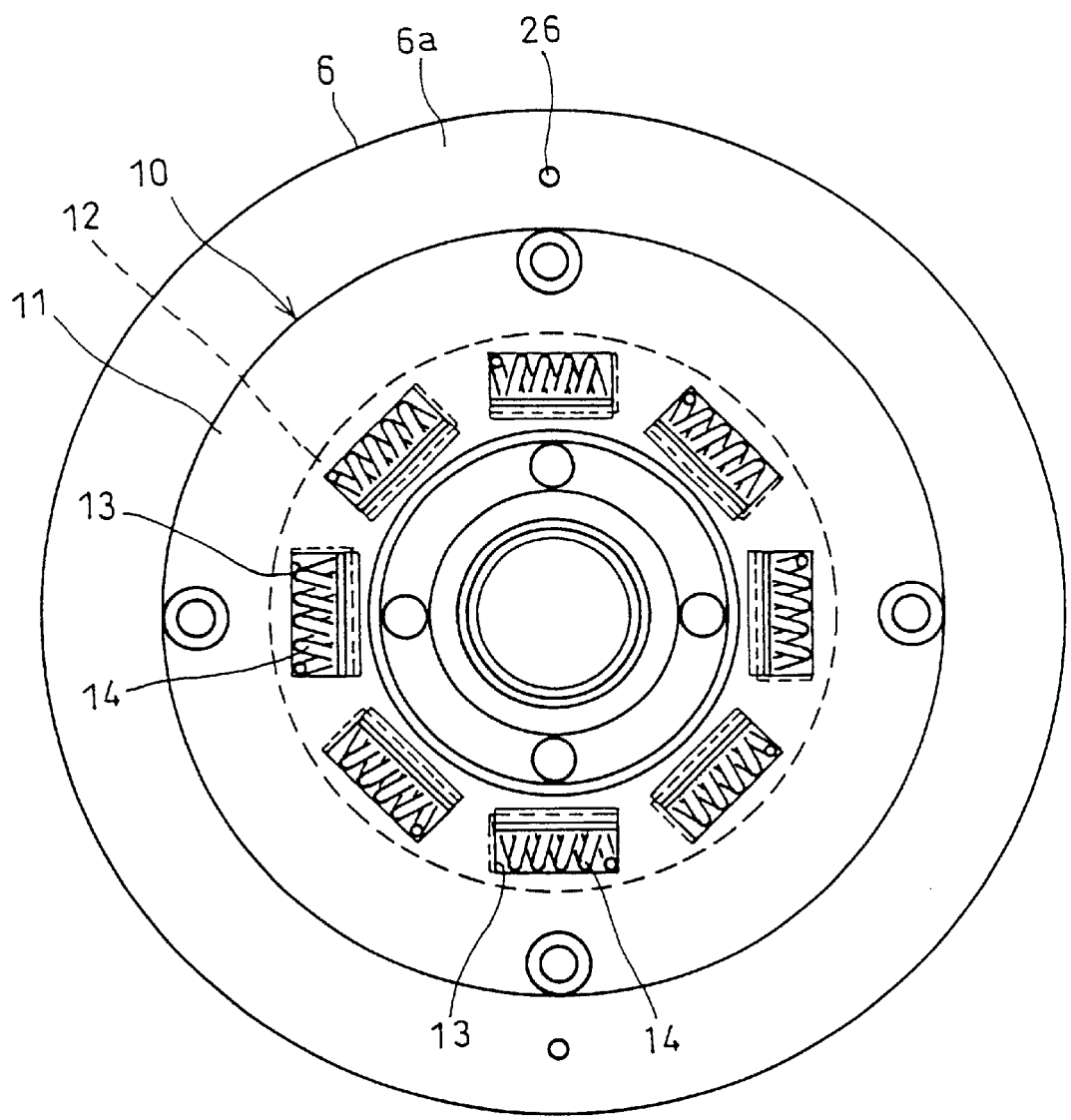
FIG. 4 is a right-hand side view of FIG. 1.

The rotation of the engine is transmitted to the input outer ring 6 through a rotation shock absorbing damper 10. As shown in FIGS. 1 and 4, the rotation shock absorbing damper 10 has two input discs 11 abutting each other, to which rotation from the engine is transmitted, and an output disc 12 having its outer peripheral portion fitted between the inner peripheral portions of the two input discs 11. The output disc 12 is fixed to the end plate 6a of the input outer ring 6.

A plurality of windows 13 are formed in the portion where the input discs 11 and the output disc 12 overlap with each other. A spring 14 is mounted in each window 13. When the turning torque from the engine is transmitted to the input discs 11, the latter are turned relative to the output disc 12 to elastically deform the springs 14, thereby transmitting the rotation of the input discs 11 to the output disc 12 through the springs 14 while absorbing the impact force upon transmission of the rotation by the deformation of the springs 14.

As shown in FIG. 1, a control type slip clutch 20 is mounted between the input outer ring 6 and the output shaft 2. Also, between the input shaft 1 and the output shaft 2, a control type two-way clutch 30 is mounted.

The control type slip clutch 20 is a wet type multiple disc clutch which comprises friction discs 21 and friction discs 22 mounted alternately inside of the input outer ring 6. The friction discs 21 are supported so as not to rotate relative to the input outer ring 6 but to be movable in the axial direction. The friction discs 22 are supported so as not to rotate relative to the output shaft 2 but to be movable in the axial direction. A stopper ring 23 is mounted at the open end of the input outer ring 6 to keep the friction discs 21, 22 from coming off.

Inside of the input outer ring 6, a slidable piston 24 and a return spring 25 biasing the piston 24 toward the end plate 6a of the input outer ring 6 are mounted. By supplying hydraulic pressure through an oil supply passage 26 formed in the end plate 6a into a cylinder chamber 27 formed between the piston 24 and the end plate 6a, the piston 24 is moved to press the friction discs 21 and 22 together, thereby transmitting the rotation of the input outer ring 6 to the output shaft 2 under the frictional force acting between the friction discs 21 and 22.

Figure 5:
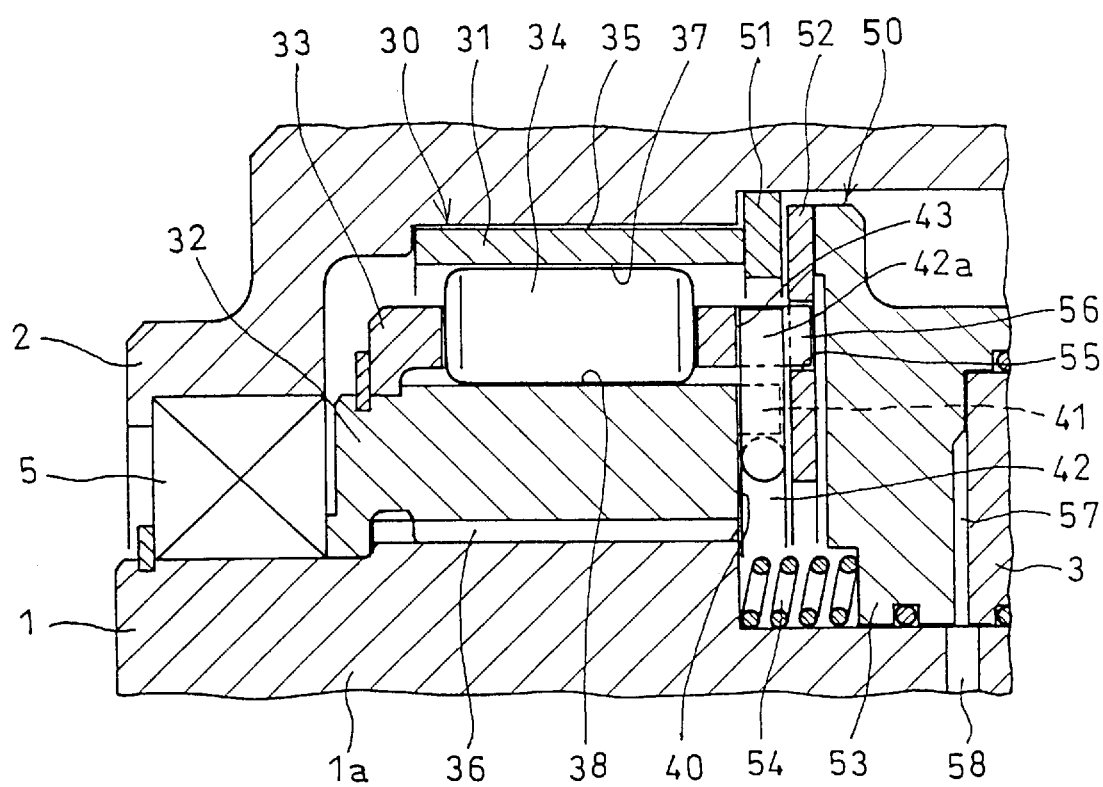
FIG. 5 is an enlarged sectional view of a two-way roller clutch portion of FIG. 1.

As shown in FIGS. 5 and 6, the control type two-way clutch 30 is a two-way roller clutch. It comprises a clutch outer ring 31, a clutch inner ring 32, a retainer 33 mounted between the rings 31, 32, and rollers 34 as engaging elements retained by the retainer 33.

The clutch outer ring 31 is fitted on the inner periphery of the output shaft 2 with a microgap 35 formed between the fitting surfaces. The clutch inner ring 32 is fitted on a large-diameter shaft portion 1a of the input shaft 1 and is prevented from rotating relative to the shaft portion 1a by serrations 36. Instead of the serrations, the clutch inner ring 32 may be prevented from rotating relative to the shaft portion 1a by splines.

On the outer periphery of the clutch inner ring 32, a plurality of cam faces 38 are formed at circumferential intervals. Wedge-shaped spaces are formed between the cam faces 38 and a cylindrical inner surface 37 of the clutch outer ring 31.

In the retainer 33, pockets 39 are formed at positions opposite the cam faces 38. The rollers 34 are received in the pockets 39.

Figure 3:
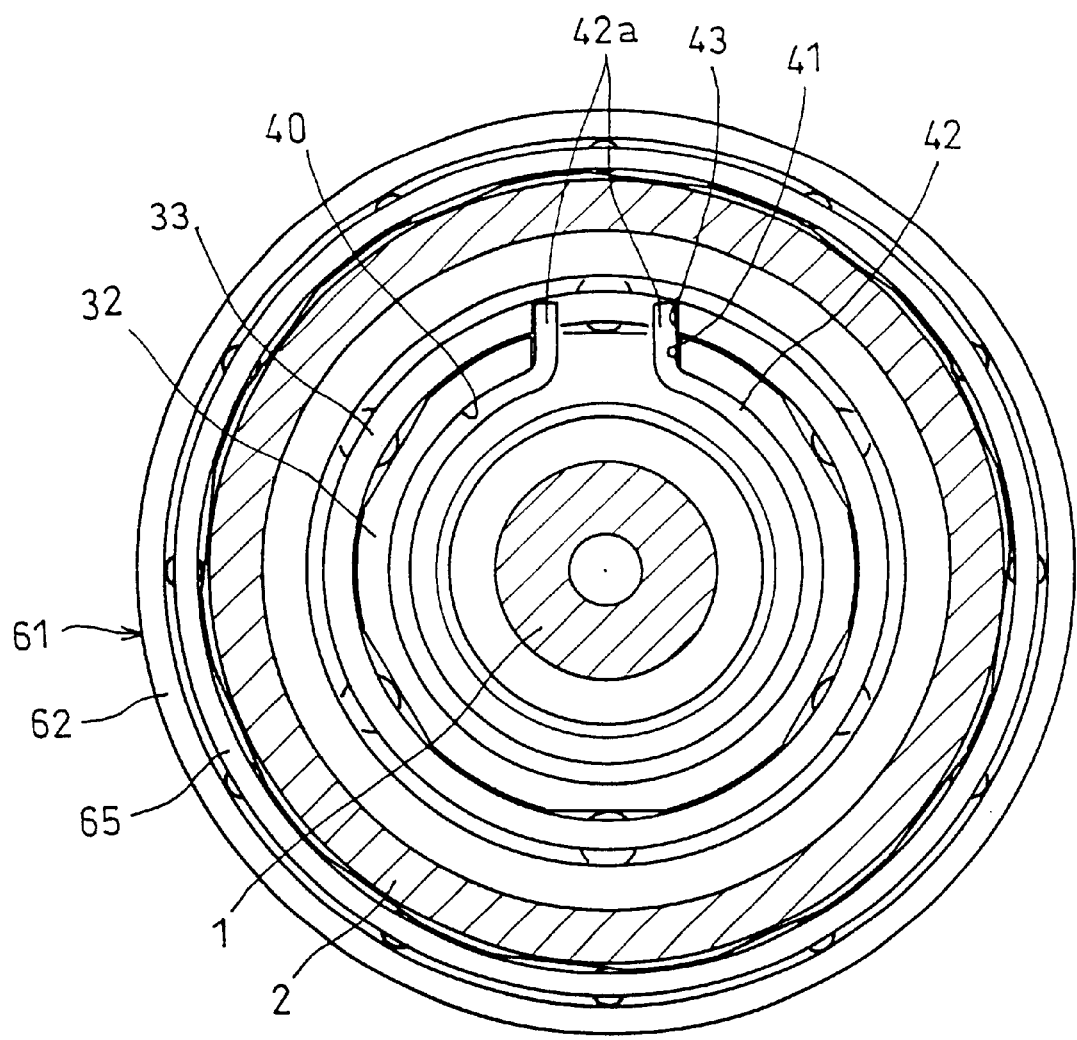
FIG. 3 is a sectional view taken along line III—III of FIG. 1.
Figure 6A:
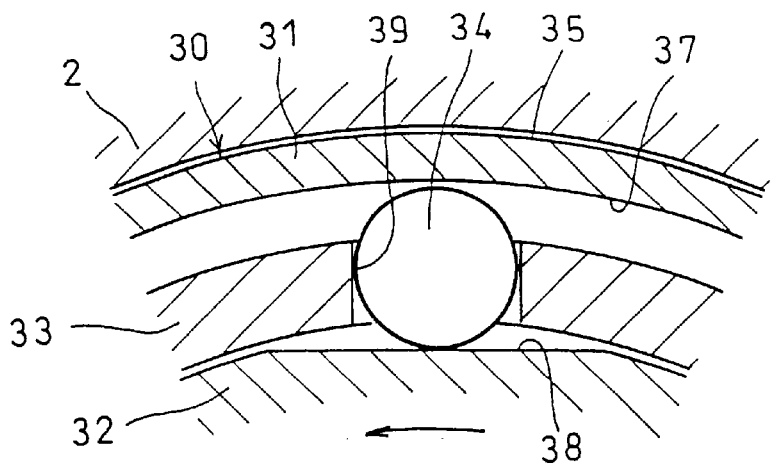
FIGS. 6A–C are sectional views showing operational states of the two-way clutch in a stepwise manner.

In the end face of the clutch inner ring 32, a circular recess 40 is formed and a cutout 41 is formed in the peripheral wall of the recess 40. As shown in FIGS. 3 and 5, an arcuate switch spring 42 is mounted in the recess 40. At both ends of the switch spring 42, a pair of diametrically outwardly extending engaging pieces 42a are formed. They are inserted through the cutout 41 into a cutout 43 formed in the end face of the retainer 33. By the action of the pair of engaging pieces 42a which push the circumferential end walls of the cutouts 41 and 43, the retainer 33 is held in a neutral position in which as shown in FIG. 6A, the rollers 34 are not in engagement with the cylindrical inner surface 37 or the cam surfaces 38.

As shown in FIG. 1, the retainer 33 of the two-way roller clutch 30 has its rotation restricted by a rotation control mechanism 50 provided between the two-way roller clutch 30 and the bearing support ring 3. The rotation control mechanism 50 comprises a ring-like friction plate 51, a ring-like engaging plate 52, a piston 53 slidable along the outer periphery of the input shaft 1 and the outer periphery of the bearing support ring 3, and a return spring 54 biasing the piston 53 toward the bearing support ring 3, which are all mounted between the two-way roller clutch 30 and the bearing support ring 3. As shown in FIG. 5, an engaging hole 55 is formed in the engaging plate 52 and a protrusion 56 formed on one end face of the retainer 33 is engaged in the engaging hole 55.

As shown in FIG. 1, the input shaft 1 is formed with an oil supply passage 58 which communicates with a cylinder chamber 57 formed between the piston 53 and the bearing support ring 3. By supplying hydraulic pressure through the oil supply passage 58 into the cylinder chamber 57, the piston 53 is biassed toward the two-way roller clutch 30 to press the engaging plate 52 against a wall surface formed on the output shaft 2 through the friction plate 51 and the clutch outer ring 31, thereby keeping the clutch outer ring 31 and the retainer 33 at a stop.

Figure 2:
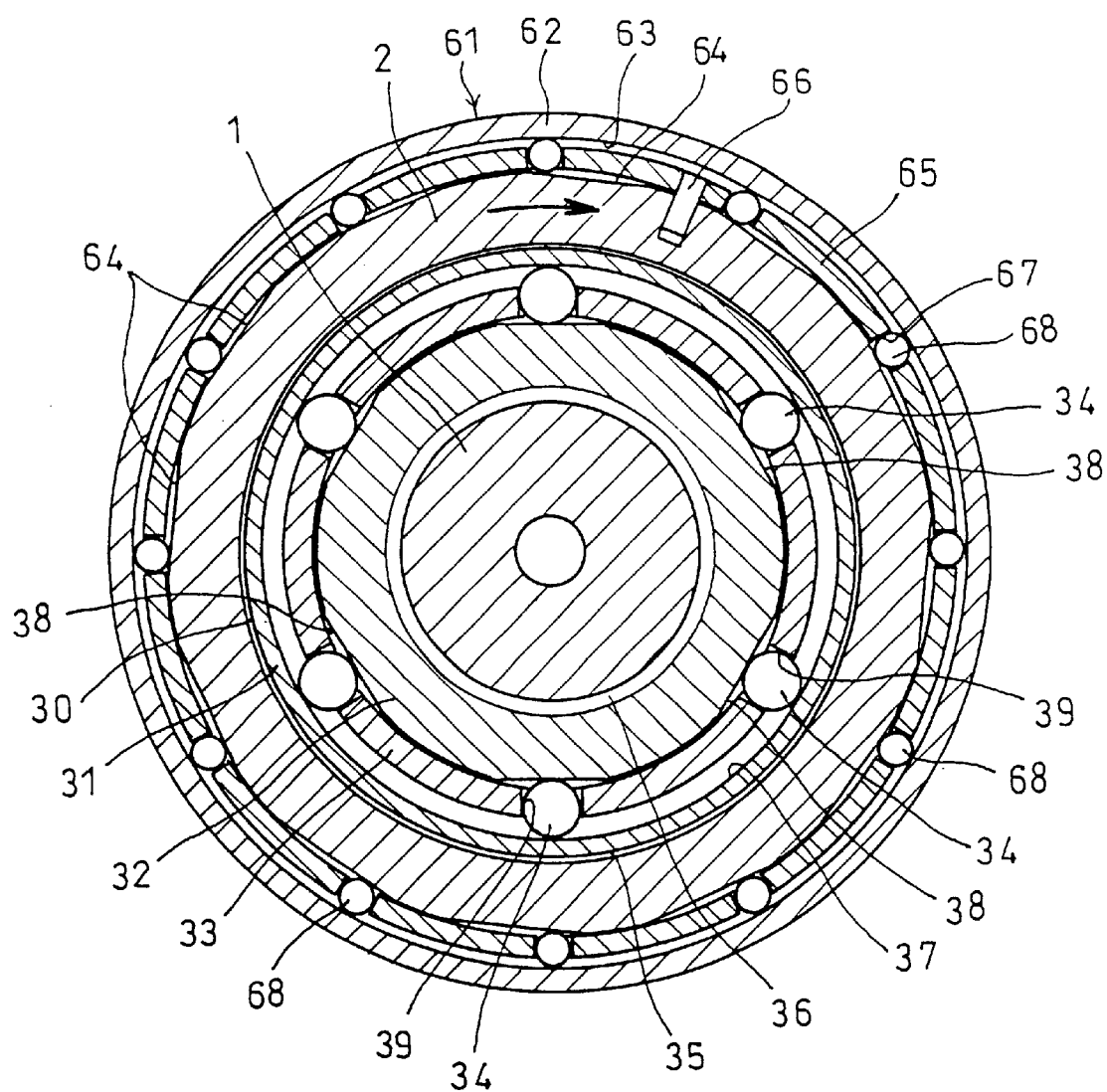
FIG. 2 is a sectional view taken along line II—II of FIG. 1.

As shown in FIGS. 1 and 2, a one-way clutch 61 is mounted between the output shaft 2 and a housing 60 as a stationary member. The one-way clutch 61 is a one-way roller clutch.

The one-way roller clutch 61 comprises a clutch outer ring 62 pressed into the housing 60. On the outer periphery of the output shaft 2, cam faces 64 are formed to form wedge-shaped spaces between them and a cylindrical inner surface 63 of the clutch outer ring 62. A retainer 65 mounted between the clutch outer ring 62 and the output shaft 2 is fixed to the output shaft 2 by a knock pin 66 (FIG. 2). The retainer 65 is formed with pockets 67 at positions opposing the cam faces 64. Rollers 68 mounted in the pockets 67 are brought into contact with the cam faces 64 and the cylindrical inner surface 63.

The one-way clutch 61 is adapted to lock the output shaft 2 if a turning torque is transmitted from the vehicle wheel side to the output shaft 2 in a direction opposite to the revolving direction of the engine, by bringing the rollers 68 into engagement with the cylindrical inner surface 63 and the cam faces 64.

The power transmission device in the embodiment has the above-described structure. At the start, this power transmission device keeps the wet type multiple disc clutch 20 in an engaged state to transmit rotation transmitted from the engine to the input outer ring 6 through the rotation shock absorbing damper 10 to the output shaft 2.

When the turning torque of the output shaft 2 reaches a preset value, or the difference in the number of revolutions between the input shaft 1 and the output shaft 2 drops below a predetermined value, the two-way roller clutch 30 is engaged. After the two-way roller clutch 30 has been engaged, the wet type multiple disc clutch 20 is disengaged.

In coupling the wet type multiple disc clutch 20, by supplying hydraulic pressure through the oil supply passage 26 formed in the end plate 6a of the input outer ring 6 into the cylinder chamber 27, the piston 24 is moved to press the friction discs 21, 22 together, thereby transmitting the rotation of the input outer ring 6 to the output shaft 2 by the frictional force acting between the friction discs 21, 22.

Since the wet type multiple disc clutch 20 transmits the rotation of the input outer ring 6 to the output shaft 2 while producing slip, it is possible to smoothly rotate the output shaft 2.

When the turning torque of the input outer ring 6 is transmitted to the output shaft 2 through the wet type multiple disc clutch 20, the rollers 34 of the two-way roller clutch 30 are held by the elasticity of the switch spring 42 in a neutral position in which they are not in engagement with the cylindrical inner surface 37 or the cam faces 38 as shown in FIG. 6A. Thus, the rollers 34 and the retainer 33, which retains the rollers 34, rotate together with the input shaft 1, which is rotated from the input outer ring 6.

When engaging the two-way roller clutch 30, by supplying oil pressure through the oil supply passage 58 formed in the input shaft 1 into the cylinder chamber 57, the piston 53 is moved toward the two-way roller clutch 30 to press the engaging plate 52 against the wall surface formed on the output shaft 2 through the friction plate 51 and the clutch outer ring 31.

Since the protrusion 56 formed on the end face of the retainer 33 is engaged in the engaging hole 55 formed in the engaging plate 52, when the engaging plate 52 is pressed against the friction plate 51, the retainer 33 is prevented from turning, so that the input shaft 1 and the clutch inner ring 32 rotate relative to the retainer 33.

Figure 6B:
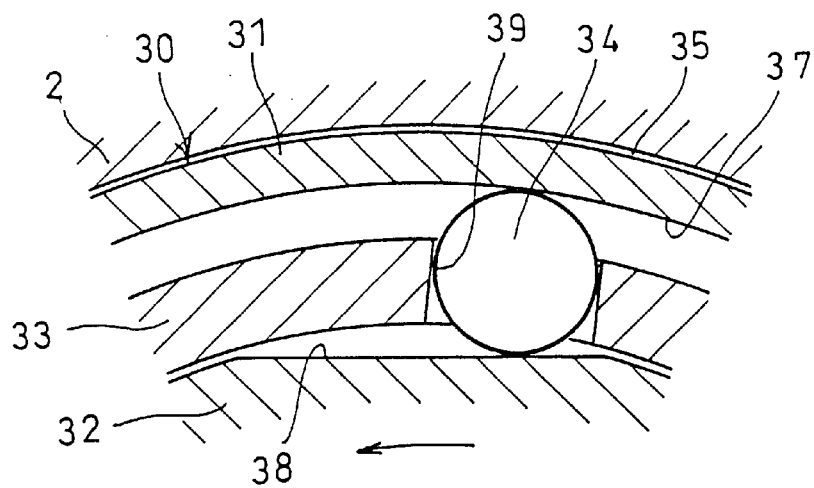

When the clutch inner ring 32 rotates in the direction of the arrow of FIG. 6A relative to the retainer 33, since the clutch outer ring 31 is in frictional contact with the output shaft 2 in the axial direction, as shown in FIG. 6B, the rollers 34 engage the cylindrical inner surface 37 of the clutch outer ring 31 and the cam surfaces 38 of the clutch inner ring 32. When the clutch inner ring 32 further turns relative to the retainer 33 from this engaged state, the rollers 34 strongly press part of the inner peripheral surface of the clutch outer ring 31 outwardly. This pressing deforms part of the clutch outer ring 31 in the diametrically outer direction as shown in FIG. 6C into engagement with the inner surface of the output shaft 2, so that the rotation of the input shaft 1 is transmitted to the output shaft 2 through the two-way roller clutch 30.

Figure 6C:
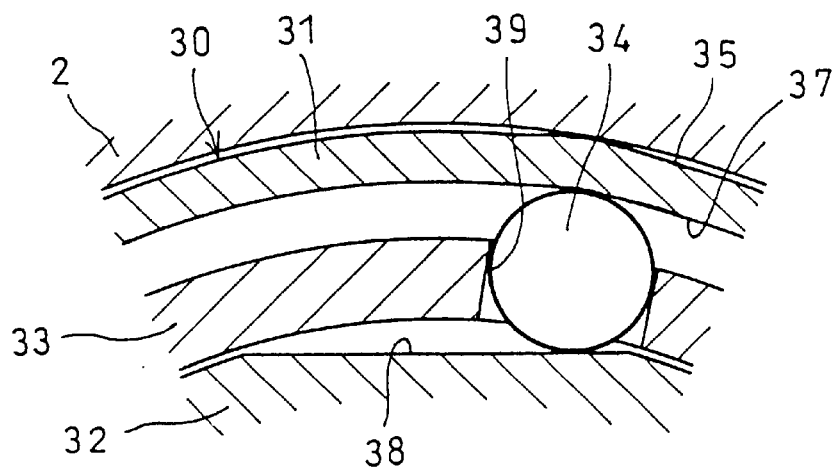

As shown in FIG. 6C, the two-way clutch 30 produces slip from when part of the clutch outer ring 31 is deformed into contact with the inner peripheral surface of the output shaft 2 until it engages. That is, the frictional force acting on the contact surfaces between the wall surfaces of the clutch outer ring 31 and the output shaft 2 by the piston 53 increases until the clutch outer ring 31 and the output shaft 2 engage. But this frictional force is small during its increase, so that slip is produced between the clutch outer ring 31 and the output shaft 2. Thus, due to this slip and the deformation of the clutch outer ring 31, it is possible to absorb shocks upon biting or engagement.

During a normal travel state, since the rotation of the input shaft 1 is transmitted to the output shaft 2 through the two-way roller clutch 30, the transmission efficiency is so high that it is possible to improve the fuel cost.

When the automobile is at stop on an upward slope and the brake pedal is released from depressing for restart, rotation in the reverse direction to the rotational direction of the engine (rotation shown by the arrow in FIG. 2) is transmitted to the output shaft 2 from the vehicle wheels. At such a time, the rollers 68 of the one-way clutch 61 engage the inner peripheral surface of the clutch outer ring 62 and the cam surfaces 64 of the output shaft 2. By this engagement, the output shaft 2 will be locked. This prevents the automobile from moving in the reverse direction to the advancing direction. This makes it easy to start on a slope.

Figure 7:
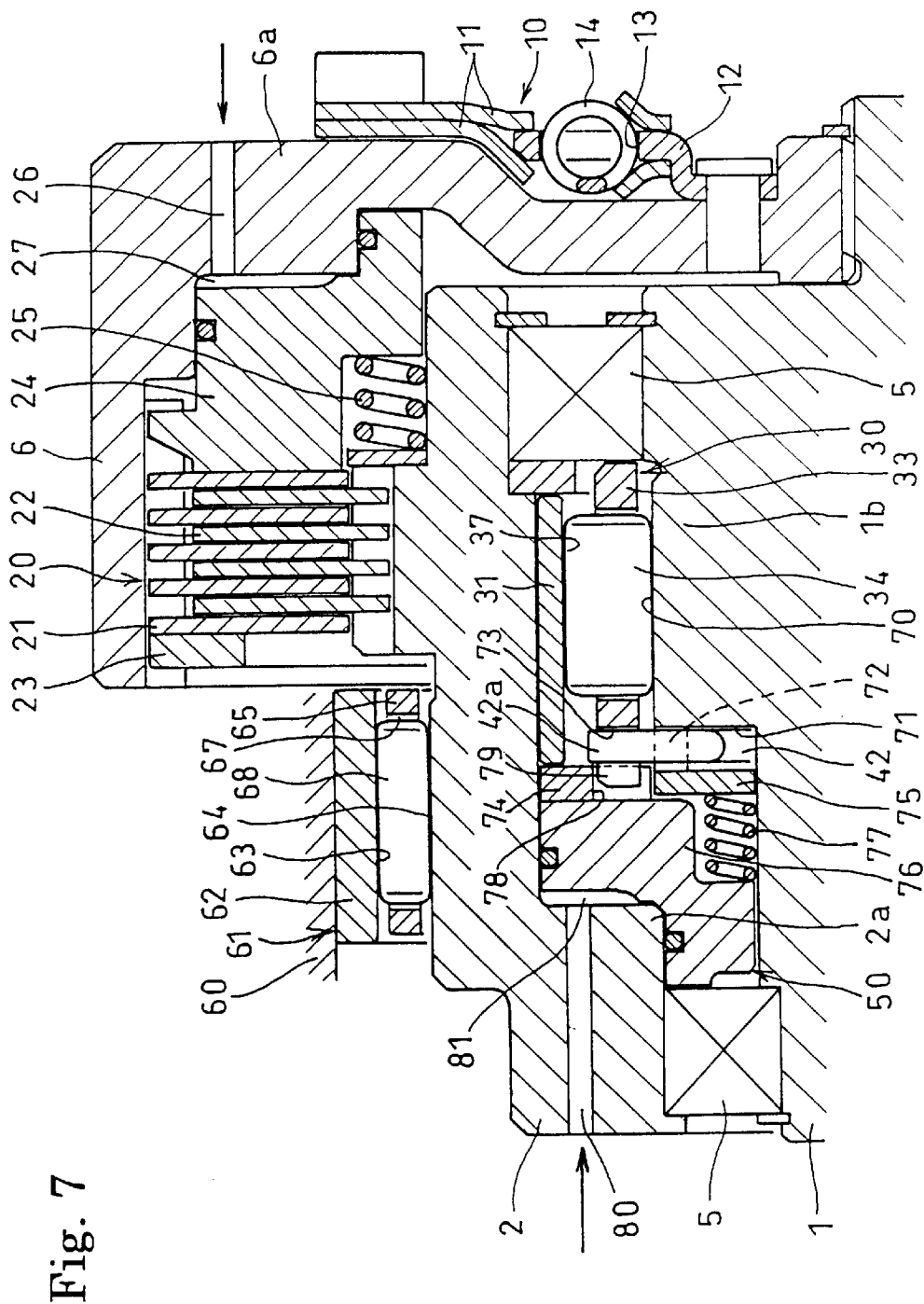
FIG. 7 is a longitudinal sectional view showing a second embodiment of the power transmission device according to this invention.

FIG. 7 shows the second embodiment of the power transmission device according to this invention. In the second embodiment, a large-diameter shaft portion 1b is formed on the input shaft 1. Bearings 5 are mounted between the large-diameter shaft portion 1b and the rear end of the output shaft 2 and between the front ends of the input shaft 1 and the output shaft 2 to relatively rotatably support the input shaft 1 and the output shaft 2.

For the two-way roller clutch 30, cam faces 70 are formed on the outer periphery of the large-diameter shaft portion 1b. A circular recess 71 is formed in an end face of the large-diameter shaft portion 1b and a cutout 72 is formed in the peripheral wall of the circular recess 71. A switch spring 42 received in the circular recess 71 has engaging pieces 42a at both ends which are inserted through the cutout 72 into a cutout 73 formed in an end face of the retainer 33 to keep the retainer in a neutral position in which the rollers 34 are not in engagement with the cylindrical inner surface 37 of the clutch outer ring 31 or the cam faces 70.

Between the two-way roller clutch 30 and the bearings 5 supporting the front end of the output shaft 2, a rotation control mechanism 50 for controlling the rotation of the retainer 33 of the two-way roller clutch 30 is mounted.

In the rotation control mechanism 50, a ring-like engaging plate 74, a ring-like spring-receiving plate 75, a slidable piston 76 and a return spring 77 for biasing the piston 76 in a direction away from the two-way clutch 30 are mounted between the two-way clutch 30 and the bearing 5. A protrusion 79 formed on an end face of the retainer 33 is engaged in a cutout 78 formed in the inner periphery of the engaging plate 74.

In operation of the rotation control mechanism 50, by supplying oil pressure through an oil supply passage 80 formed in the output shaft 2 into a cylinder chamber 81 formed between the piston 76 and a shoulder portion 2a of the output shaft 2, the piston 76 is moved toward the two-way roller clutch 30 to press the engaging plate 74 against the clutch outer ring 31 of the two-way roller clutch 30, thereby keeping the engaging plate 74 and the retainer 33 from rotating.

Since other structures are the same as those of the power transmission device shown in FIG. 1, the same parts are denoted by the same numerals and their description is omitted.

In the second embodiment, since it is possible to omit the bearing support ring 3 and the clutch inner ring 32 of the two-way roller clutch 30, the number of parts is smaller, so that it is possible to reduce the cost.

In the first and second embodiments, the clutch outer ring 31 of the two-way roller clutch 30 is loosely fitted into the inner peripheral surface of the output shaft 2. But the clutch outer ring 31 may be pressed thereinto.

In the first and second embodiments, as the control type slip clutch 20, a wet type multiple disc clutch is used. But it is not limited thereto. For example, it may be a powder clutch.

Further, as the control type two-way clutch, a two-way roller clutch having the clutch outer ring 31 is used. But the clutch outer ring 31 may be omitted. In this case, a cylindrical surface is formed on the inner periphery of the output shaft 2 so that the rollers 34 will engage and disengage to and from the cylindrical surface. Also, the control type two-way clutch 30 is not limited to a two-way roller clutch. For example, it may be a sprag type two-way clutch in which sprags are mounted between a cylindrical outer surface of an input shaft 1 and a cylindrical inner surface of an output shaft 2, and a retainer for retaining the sprags is controlled to bring the sprags into and out of engagement with the cylindrical outer peripheral surface of the input shaft 1 and the cylindrical inner peripheral surface of the output shaft 2.

As described above, according to this invention, by providing a one-way clutch between the output shaft and a stationary member provided outside of it, when the brake pedal is released from being depressed on an upward slope, the one-way clutch operates to lock the output shaft. Thus it is possible to make it easy to start on a slope.

Also, by using the two-way clutch having a clutch outer ring and fitting the clutch outer ring on the inner peripheral surface of the output shaft with a small clearance, it is possible to absorb shocks due to biting of the engaging elements upon engagement of the two-way clutch with the elastic deformation of the clutch outer ring. Thus it is possible to smoothly transmit the rotation of the input shaft to the output shaft.

What is claimed is:

1. A power transmission device comprising an input shaft to which the turning torque of an engine is transmitted, an annular output shaft mounted coaxially with said input shaft for transmitting the turning torque transmitted from said input shaft to a vehicle wheel side, a control type slip clutch mounted between said input shaft and said output shaft for engaging said input shaft and said output shaft together while producing slip, a mechanical type control type two-way clutch using engaging elements for engaging said input shaft and said output shaft together after said control type slip clutch has been engaged, and a one-way clutch provided between said output shaft and a stationary member provided radially outside of said output shaft for engaging said output shaft with said stationary member to lock said output shaft when a turning torque in an opposite direction to the rotating direction of the engine is transmitted to said output shaft from the vehicle wheel side, wherein said control type slip clutch and said control type two-way clutch are controlled by hydraulic pressure.

2. The power transmission device as claimed in claim 1 wherein in a power transmission line for transmitting a turning torque from the engine to said input shaft, a rotation shock absorbing damper for damping shocks in a rotational direction is provided.

3. The power transmission device as claimed in claim 2 wherein said control type slip clutch is a wet type multiple disc clutch.

4. The power transmission device as claimed in claim 2 wherein said control type two-way clutch is a control type two-way roller clutch comprising a retainer mounted between said input shaft and said output shaft and rollers retained by said retainer and engaged in narrow portions of wedged-shaped spaces to transmit rotation of said input shaft to said output shaft.

5. The power transmission device as claimed in claim 2 wherein said control type two-way clutch includes a clutch outer ring fitted on the inner periphery of said output shaft.

6. The power transmission device as claimed in claim 2 wherein said one-way clutch comprises rollers which are adapted to engage into narrow portions of wedge-shaped spaces to lock said output shaft.

7. The power transmission device as claimed in claim 1, wherein said control type slip clutch is a wet type multiple disc clutch.

8. The power transmission device as claimed in claim 7 wherein said control type two-way clutch is a control type two-way roller clutch comprising a retainer mounted between said input shaft and said output shaft and rollers retained by said retainer and engaged in narrow portions of wedged-shaped spaces to transmit rotation of said input shaft to said output shaft.

9. The power transmission device as claimed in claim 7 wherein said control type two-way clutch includes a clutch outer ring fitted on the inner periphery of said output shaft.

10. The power transmission device as claimed in claim 7 wherein said one-way clutch comprises rollers which are adapted to engage into narrow portions of wedge-shaped spaces to lock said output shaft.

11. The power transmission device as claimed in claim 1 wherein said control type two-way clutch is a control type two-way roller clutch comprising a retainer mounted between said input shaft and said output shaft and rollers retained by said retainer and engaged in narrow portions of wedged-shaped spaces to transmit rotation of said input shaft to said output shaft.

12. The power transmission device as claimed in claim 11 wherein said control type two-way clutch includes a clutch outer ring fitted on the inner periphery of said output shaft.

13. The power transmission device as claimed in claim 11 wherein said one-way clutch comprises rollers which are adapted to engage into narrow portions of wedge-shaped spaces to lock said output shaft.

14. The power transmission device as claimed in claim 1 wherein said control type two-way clutch includes a clutch outer ring fitted on the inner periphery of said output shaft.

15. The power transmission device as claimed in claim 14 wherein said one-way clutch comprises rollers which are adapted to engage into narrow portions of wedge-shaped spaces to lock said output shaft.

16. The power transmission device as claimed in claim 1 wherein said one-way clutch comprises rollers which are adapted to engage into narrow portions of wedge-shaped spaces to lock said output shaft.

17. A power transmission device comprising an input shaft to which the turning torque of an engine is transmitted, an annular output shaft mounted coaxially with said input shaft for transmitting the turning torque transmitted from said input shaft to a vehicle wheel side, a control type slip clutch mounted between said input shaft and said output shaft for engaging said input shaft and said output shaft together while producing slip, a mechanical type control type two-way clutch using engaging elements for engaging said input shaft and said output shaft together after said control type slip clutch has been engaged, and a one-way clutch provided between said output shaft and a stationary member provided radially outside of said output shaft for engaging said output shaft with said stationary member to lock said output shaft when a turning torque in an opposite direction to the rotating direction of the engine is transmitted to said output shaft from the vehicle wheel side, wherein said control type two-way clutch includes a clutch outer ring fitted on the inner periphery of said output shaft, and wherein said clutch outer ring is fitted on the inner periphery of said output shaft with a small gap.

18. The power transmission device as claimed in claim 17 wherein said control type slip clutch and said control type two-way clutch are controlled by hydraulic pressure.

19. The power transmission device as claimed in wherein said one-way clutch comprises rollers which are adapted to engage into narrow portions of wedge-shaped spaces to lock said output shaft.

* * * * *